United States Patent [19]
Hawkins

[11] Patent Number: 5,846,653
[45] Date of Patent: Dec. 8, 1998

[54] POLY(α-OLEFIN) PRESSURE SENSITIVE ADHESVIE TAPE WITH A PRIMING LAYER

[75] Inventor: Stephen J. Hawkins, St. Paul, Minn.

[73] Assignee: Minnesota Mining and Manufacturing Company, St. Paul, Minn.

[21] Appl. No.: 576,737

[22] Filed: Dec. 21, 1995

[51] Int. Cl.⁶ .......................................................... C09J 7/02
[52] U.S. Cl. .................... 428/353; 428/354; 428/355 EN
[58] Field of Search .................................... 428/353, 354, 428/355

[56] References Cited

U.S. PATENT DOCUMENTS

| | | | |
|---|---|---|---|
| 3,542,717 | 11/1970 | Lipman | 260/27 |
| 3,635,755 | 1/1972 | Balinth et al. | 117/122 |
| 5,019,167 | 5/1991 | Johnson | 106/241 |
| 5,112,882 | 5/1992 | Babu et al. | 522/158 |
| 5,209,973 | 5/1993 | Wille | 428/353 |
| 5,385,965 | 1/1995 | Bernard et al. | 524/272 |

FOREIGN PATENT DOCUMENTS

| | | | |
|---|---|---|---|
| 0 622 432 A1 | 11/1994 | European Pat. Off. | C09J 7/04 |
| 88-274258 | 8/1988 | Japan | B32B 7/06 |
| 61-23100 | 5/1994 | Japan | D21H 27/00 |

*Primary Examiner*—Jenna Davis
*Attorney, Agent, or Firm*—Gary L. Griswold; Walter N. Kirn

[57] ABSTRACT

In a PSA tape construction, a primer layer comprising a neutralized rosin that includes acid functionalities and, optionally, an elastomer such as a styrene-butadiene rubber, is included between a tape backing and a poly(α-olefin) adhesive layer. Bonding of the adhesive layer to the backing is greatly improved, especially during and after high temperature baking of the tape construction.

29 Claims, No Drawings

POLY(α-OLEFIN) PRESSURE SENSITIVE ADHESVIE TAPE WITH A PRIMING LAYER

BACKGROUND INFORMATION

1. Field of the Invention

This invention relates to a primer that improves adhesion of a poly(α-olefin) pressure sensitive adhesive layer to a tape backing.

2. Background of the Invention

In the field of pressure sensitive adhesives (PSAs), predictable control over mechanical and process properties is desirable so that such adhesives can be tailored for specific, highly demanding end use applications such as packaging, medical, and masking tapes. These applications require a proper balance of properties, and this balance changes with each end use.

Natural and synthetic rubbers were among the earliest polymers to provide a reasonable balance of the properties required for satisfactory PSA performance. However, those skilled in the art recognized that ethylenically unsaturated groups had to be eliminated from the polymer backbone to improve the oxidative stability of the adhesives. This became possible with the discovery of the catalytic activity of Ziegler-Natta (ZN) coordination systems toward α-olefin monomers and the subsequent production of high molecular weight polymers. Homopolymers of the $C_6$ to $C_{10}$ α-olefins were naturally tacky, had low toxicity, aged well, and were environmentally stable, chemically inert, resistant to plasticizer migration, and relatively inexpensive. These characteristics made them good candidates for PSA applications. However, their poor cohesive strength meant that they lacked the shear adhesion necessary for high performance PSAs.

Poly(α-olefin) adhesive compositions comprising mixtures of α-olefin polymers and copolymers are known. See, e.g., U.S. Pat. Nos. 3,542,717 and 3,635,755. However, such compositions proved not to have sufficient shear adhesion at elevated temperatures to be suitable for demanding applications such as, for example, masking tapes. This high temperature shear problem was solved in U.S. Pat. No. 5,112,882 in which is described a radiation curable, α-olefin homo- or copolymer PSA composition based primarily on α-olefins. That composition provides adhesive films with a superior balance of peel and shear performance.

Poly(α-olefin) PSAs adhere well to many substrates, including low energy surfaces, and have proven to be good at not damaging the surfaces of sensitive substrates (e.g., anodized aluminum as is used in certain automobiles and aircraft parts). However, poly(α-olefin) PSAs have not been widely used for certain high performance applications because of adhesive transfer to the surface. This adhesive transfer is an anchorage failure rather than a cohesive failure of the adhesive (i.e., the adhesive does not remain bonded to the backing but instead transfers en masse to the protected surface when the tape is removed). This transfer most often occurs during removal of the PSA from a substrate at a high temperature (e.g., 165° C. or greater), from a substrate that has been heated to a high temperature and then allowed to cool, and/or under some very low rate peel conditions.

One of the most stringent applications for any PSA is that of a high temperature masking tape, often used in the automotive industry during painting and detailing processes. Such masking tapes must protect the automobile surface during bake cycles of up to an hour at approximately 165° C., yet remove cleanly from the surface thereafter.

In addition to automotive masking applications, masking of aircraft during painting procedures has become quite challenging. Tapes presently used to mask aircraft during painting have proven to be ineffective in the presence of high boiling solvents used in low-VOC paints. (VOC is an abbreviation for "volatile organic compound".) Historically, paints containing VOCs such as toluene, heptane, mineral spirits, and methyl ethyl ketone, have been used during various steps of the aircraft painting process. However, governmental entities have begun to heavily regulate the use of such VOCs, making questionable the continued use of paints containing them. A masking tape able to withstand prolonged exposure to the high boiling solvents presently being used in paint formulations has yet to be demonstrated.

A poly(α-olefin) PSA tape construction in which the adhesive does not transfer to the protected surface is highly desirable. Additional benefits would be achieved if such a tape construction could be used for masking applications where low-VOC solvents are to be used.

SUMMARY OF THE INVENTION

Briefly, the present invention provides a tape construction that includes a substrate (i.e., a backing), at least one surface of which is coated with a primer that comprises a rosin comprising acid functionalities that have been neutralized, and a layer of a poly(α-olefin) PSA coated on the primer. The rosin preferably is at least partially hydrogenated. The primer optionally can include an elastomer that is compatible with both the rosin and any saturant in the tape backing.

This tape construction provides for improved adherence of a poly(α-olefin) PSA layer to the backing, i.e., reduces or eliminates adhesive transfer. This improved bond between the poly(α-olefin) adhesive and the tape backing is necessary for such a tape construction to be useful as a high performance tape such as an automobile masking tape, an aircraft masking tape, or an autoclave indicator tape. Additionally, when compared to currently available high temperature masking tapes, the tape construction of the present invention exhibits superior resistance to staining of painted surfaces.

Poly(α-olefins) have excellent adhesion properties, thermal-oxidative stability, and chemical/electrical resistance. Additionally, they are physiologically inert. These properties make them excellent PSAs (upon crosslinking) for a wide range of applications, especially those where independent control of peel and shear adhesion are desirable.

In the tape construction of the present invention, the poly(α-olefin) can be applied to the primed substrate by a wide range of processes including, for example, solution coating, solution spraying, hot-melt extrusion, emulsion coating, etc., to make a variety of adhesive tapes, specifically masking tapes. Such masking tapes find particular utility in the protection of metallic surfaces, especially steel and aluminum such as those used in automobile and aircraft bodies.

Unless a contrary intention is indicated, the following definitions apply herein:

"primer" means a layer of material, located between an adhesive layer and a substrate or backing, which promotes adherence between the adhesive and the substrate;

"(meth)acrylate" means methacrylate and acrylate; and

"group" or "compound" or "monomer" or "polymer" means a chemical species that allows for substitution by conventional substituents (e.g., alkyl, alkoxy, aryl, phenyl, halo, etc.) that do not interfere with the desired use or product.

DETAILED DESCRIPTION OF PREFERRED EMBODIMENTS

In the tape construction of the present invention, the α-olefin polymer comprises one or more mer units derived from an α-olefin monomer that is a liquid at standard temperature and pressure. The monomer preferably is a $C_5$–$C_{30}$ α-olefin, more preferably a $C_6$–$C_{20}$ α-olefin, most preferably a $C_6$–$C_{12}$ α-olefin. Such monomers optionally can be substituted with conventional substituents (i.e., those that do not interfere with the polymerization of these monomers or with the desired properties of the polymer produced therefrom). Such an olefin can either be linear or branched (i.e., comprising one or more side chains). Common examples include 1-pentene, 1-hexene, 1-heptene, 1-octene, 1-nonene, 1-decene, 1-undecene, 1-dodecene, 1-hexadecene, 1-octadecene, and 4-methyl-1-pentene. Particularly preferred α-olefin monomers include 1-hexene and 1-octene. Blends of one or more of these monomers plus a lower (i.e., $C_2$–$C_4$) 1-alkene are also within the scope of the present invention. A full description of a preferred α-olefin polymer can be found in U.S. Pat. No. 5,112,882.

The α-olefin polymer can be a homopolymer or a random co, ter, or tetra polymer. It can also comprise blocks of homopoly(α-olefins) interspersed with mer units derived from various other copolymerizable monomers. Examples of potentially useful copolymerizable monomers include polyenes such as, for example, the $C_6$–$C_{14}$ α,ω-dienes, conjugated dienes, trienes, terpenes, and alkenylnorbornenes.

The above-described monomers can be polymerized, either in bulk or in one or more inert solvents, in the presence of a catalyst system over a wide range of temperatures, e.g., 0° to 140° C., preferably 30° to 90° C. The amount of catalyst used is preferably in the range of 0.1 to 5 g per kg of monomer. Useful catalyst systems include standard ZN catalyst systems, ZN catalyst systems where the transition metal compound is supported (e.g., on a $MgCl_2$ powder), and Kaminsky-Ewen catalyst systems. All three catalyst systems are well known by those familiar with α-olefin polymerizations. Because the particular catalyst system used does not affect the primer composition nor the overall tape construction of the present invention, they are not discussed in detail here.

Preferably, the polymer has a glass transition temperature in the range of −70° to 0° C., more preferably in the range of −60° to −20° C.; an inherent viscosity in the range of 0.4 to 9.0 dL/g, more preferably 0.5 to 6.0 dL/g, most preferably 1.5 to 4.0 dL/g; and a number average molecular weight in the range of 5,000 to 50,000,000, preferably 50,000 to 5,000,000.

Addition of one or more tackifying resins to the poly(α-olefin) can improve tack, lower viscosity, improve coatability, impart heat stability, improve peel adhesion, and enhance shear adhesion (with no concomitant loss of peel adhesion). Where a tackifying resin is used, it can be present in an amount from more than 0 to 150 parts by weight per 100 parts of polymer. Potentially useful tackifying resins include terpene resins and those derived from polymerization of $C_5$ to $C_9$ unsaturated hydrocarbon monomers. Examples of commercially available resins based on a $C_5$ olefin fraction of this type are Wingtack™ 95 and 115 tackifying resins (Goodyear Tire and Rubber Co.; Akron, Ohio). Other hydrocarbon resins include Regalrez™ 1078 and 1126 (Hercules Chemical Co. Inc.; Wilmington, Del.); Arkon resins, such as Arkon™ P115, (Arakawa Forest Chemical Industries, Chicago, Ill.); and Escorez™ resins (Exxon Chemical Co.; Houston, Tex.). Suitable terpene resins include terpene polymers, such as polymeric resinous materials obtained by polymerization and/or copolymerization of terpene hydrocarbons such as the alicyclic, monocyclic, and bicyclic monoterpenes and their mixtures. Commercially available terpene resins include the Zonarez™ B-series and 7000 series terpene resins (Arizona Chemical Corp.; Wayne, N.J.). The tackifying resin can contain ethylenic unsaturation; however, saturated tackifying resins are preferred for those applications where resistance to oxidation is important. This discussion of tackifiers is not intended to be comprehensive because they are not the subject of the present invention.

Minor amounts of additives also can be included in the polymer composition to provide adhesives for special end uses. Such additives can include pigments, dyes, plasticizers, fillers, stabilizers, UV radiation absorbers, antioxidants, processing oils, and the like. The amount of additive(s) used can vary from 0.1 to 50 weight percent, depending on the end use desired. Any additive(s) used preferably do not significantly absorb radiation near the wavelength of maximum absorption of any photocrosslinker included in the polymer composition.

Preferably, the polymer composition also includes a photocrosslinking agent that is activated by actinic radiation, typically after the polymer is coated. Suitable photocrosslinking agents include, but are not limited to, (a) aldehydes, such as benzaldehyde, chromophore-substituted acetaldehyde, and their substituted derivatives; (b) ketones, such as acetophenone, benzophenone, and their substituted derivatives, e.g., Sandoray™ 1000 (Sandoz Chemicals, Inc.; Charlotte, N.C.); (c) quinones, such as the benzoquinones, anthraquinone, and their substituted derivatives; (d) thioxanthones, such as 2-isopropylthioxanthone and 2-dodecylthioxanthone; and (e) certain chromophore-substituted vinyl halomethyl-sym-triazines, such as 2,4-bis (trichloromethyl)-6-4'-methoxyphenyl-s-triazine and 2,4-bis (trichloromethyl)-6-3',4'-dimethoxyphenyl-s-triazine. (Because many such triazines produce HCl upon activation, the addition of a basic compound to the polymeric composition can be beneficial.) Photoactive crosslinking agent can be present in a range from about 0.005 to about 2% (by wt.), preferably from about 0.01 to about 0.5% (by wt.), more preferably from about 0.05 to 0.15% (by wt.), of the polymer.

In the tape construction of the present invention, poly(α-olefin) is coated onto the primed surface of a tape backing (i.e., substrate) prior to being crosslinked. The primer comprises a neutralized hydrogenated rosin. By priming the substrate with this composition, the adhesive remains well bound to the substrate even after the tape construction has been adhered to a surface and baked. The primer composition of the present invention creates a very polar surface to which the poly(α-olefin) can adhere.

Rosins useful in the primer composition of the present invention include polar rosins that comprise acid functionalities. Those rosins that are at least partially hydrogenated are preferred. Commercially available rosins include Foral™ AX hydrogenated rosin, Dresinol™ 205 rosin, and Staybelite™ hydrogenated rosin (all available from Hercules Chemical Co.) as well as Hypale™ rosin (Arakawa). Acidic rosins are highly polar and often are used as surfactants and or tackifiers. In the tape construction of the present invention, however, this type of rosin is used to increase the adherence of a poly(α-olefin) PSA layer to a tape backing.

To neutralize the acidic rosin, it is reacted with a solution of a basic compound capable of forming a metal salt when reacted with the rosin. Useful bases include the alkali metal hydroxides (e.g., LiOH, NaOH, KOH) and the alkaline earth metal hydroxides (e.g., $CaOH_2$, $MgOH_2$). Because of solubility characteristics, the alkali metal hydroxides, especially KOH and NaOH, are preferred. Such hydroxides can be dissolved in a polar solvent such as water.

To react the rosin and the basic compound, both are dissolved in a solvent, preferably a polar solvent (because both of these compounds tend to be polar), most preferably water, and allowed to undergo an acid-base reaction. Because such reactions normally occur spontaneously, no special allowances (e.g., elevated temperature or pressure) need be made, although they can be if desired. Normally, stoichiometric amounts of rosin and base (or a slight excess of base) are used.

Optionally, the neutralized rosin can be blended with an elastomeric compound prior to being coated on the tape backing. Preferably, the elastomeric compound is very compatible with the organic portion of the rosin and with any saturant used in the tape backing. Additionally, the elastomer preferably is water dispersible. Because many available tape backings involve creped paper saturated with an acrylate polymer or a styrene-butadiene rubber (SBR) and because acrylates and SBRs are compatible with the organic portion of most hydrogenated rosins, they are preferred types of elastomers.

SBR compounds are well known in the art and available from a variety of commercial sources. Common examples include Butofan™ NS209, NS222, NS155 and NS248 rubbers (BASF Corp.; Parsippany, N.J.). Other potentially useful polymers include nitrile rubbers such as the Hycar™ series of polymers (B.F. Goodrich Co.; Akron, Ohio) and (meth)acrylate polymers.

A mixture of a rubber-based emulsion polymer, a rosin-based surfactant, and a rosin-based tackifier is described in U.S. Pat. No. 5,385,965 (Bernard et al.). Included among the list of useful rubber-based polymers is carboxylated styrene-butadiene random copolymers. Foral™ AX rosins are included among the list of useful tackifying resins. However, the invention of Bernard et al. is said to pertain to "water insoluble pressure-sensitive emulsion polymers which on blending with low levels of a surfactant and a tackifier provide a pressure-sensitive adhesive . . . " (See col. 3, lines 8–11.) In other words, the rosin and the rubber polymer are blended together so as to form a PSA composition. (See col. 9, lines 26–38.) Bernard et al. do not teach or suggest the use of an elastomer-neutralized hydrogenated rosin mixture as a primer for a separate poly(α-olefin) PSA layer.

Where an elastomeric component is used in the primer along with a neutralized rosin, the two components can be mixed in any ratio from approximately 0.01:99.99 to approximately 75:25, although an approximately 50:50 (by wt.) ratio is preferred. (Other ranges must also be appropriate depending on the coating method used.) Blending is accomplished merely by adding the elastomer to the neutralized, aqueous rosin mixture. The blend can then be diluted to a desired concentration for coating. Preferred concentrations range from about 5 to about 25% (by wt.), more preferably from about 10 to about 20% (by wt.).

A preferred primer composition for an SBR-saturated tape backing can be prepared by neutralizing Foral™ AX rosin with an approximately stoichiometric amount of a strong base (e.g., an aqueous solution of KOH) in water at an elevated temperature (e.g., about 88° C.). After being removed from the heat source, this neutralized rosin mixture is then combined with an approximately equal amount (by weight) of Butofan™ NS209 SBR, and this mixture is diluted to about 15% solids in water.

The primer composition can be applied to a substrate (e.g., tape backing) through any of a variety of processes including solution coating, solution spraying, emulsion coating, gravure coating, or a number of other such processes known to those skilled in the art. Useful backings include films of polyolefins (e.g., polyethylene and propylene), especially corona-treated polyolefin films, and elastomer-saturated paper. Useful coating weights range from about 0.1 to about 5 $mg/cm^2$, preferably from about 0.2 to about 1.0 $mg/cm^2$, more preferably from about 0.3 to about 0.5 $mg/cm^2$. Once coated onto a backing, the primer layer is preferably dried, and such drying is preferably performed at elevated temperature, reduced pressure, or both.

Objects and advantages of this invention are further illustrated by the following examples. The particular materials and amounts thereof, as well as other conditions and details, recited in these examples should not be used to unduly limit this invention.

EXAMPLE

A poly(α-olefin) PSA formulation was prepared to test various primer formulations. The poly(α-olefin) PSA formulation included 75% (by wt.) poly(1-octene) having an inherent viscosity of 2.6 dL/g, 20% (by wt.) Arkon™ P115 tackifier, 0.15% (by wt.) 2,4-bis(trichloromethyl)-6-4'-methoxyphenyl-sym-triazine, and 4.85% $CaCO_3$ (which assists in neutralizing the HCl produced when the triazine photocrosslinking agent is activated by actinic radiation).

This PSA formulation was coated onto a series of C83490 SBR-saturated paper tape backings (Kimberly-Clark Co.; Roswell, Ga.) previously coated with a variety of priming layers. (See Table 1 below.) The PSA-coated tapes were rolled up with a silicon liner and then, after 24 hours, cured under a nitrogen atmosphere with 300 $mJ/cm^2$ of energy, as measured by a UVIMAP™ 365 sensing device (Electronic Instrumentation and Technology, Inc.; Sterling, Va.) from medium pressure Hg lamps. (Calibration standard for UV energy was MIL-STD-45662A.)

These tape constructions were tested to determine their high temperature removal characteristics. A 17 cm×34 cm×0.155 cm annealed stainless steel panel was thoroughly cleaned with diacetone alcohol. To this panel was adhered a twelve inch (30.5 cm) sample of a tape such that six inches (15.2 cm) of the sample extended above the top edge of the panel. The sample was rolled (one pass in each direction) with a rubber-covered roller that conformed to ASTM D3330, section 5.4. (A number of samples can be tested simultaneously as long as they are spaced sufficiently apart from each other.) The free end of the sample was adhered to a 0.250 inch (0.635 cm) diameter metal rod. The panel then was placed in a 350° F. (177° C.) oven for 30 minutes. While still in the oven, the tape sample was peeled (at an angle about 135° and a rate of approximately 30 cm/sec) about half way down the panel. The panel then was removed from the oven, allowed to cool to room temperature, and the remainder of the tape sample was peeled from the panel (at an angle about 135° and a rate of approximately 30 cm/sec).

Those samples where adhesive transferred to the panel are designated as "T" in the Table below; those samples where the adhesive remained bonded to the tape are designated as "B" in the Table below.

TABLE 1

Comparison of primer compositions

| Type of elastomer | Percentage of elastomer in primer | Type of base used | Basicity level | Removability |
|---|---|---|---|---|
| 209 | 50 | KOH | −10% | T |
| 209 | 50 | KOH | 0% | B |
| 209 | 50 | KOH | +10% | B |
| 209 | 50 | NaOH | −10% | B |
| 209 | 50 | NaOH | 0% | B |
| 209 | 50 | NaOH | +10% | B |
| 209 | 50 | LiOH | −10% | B |
| 209 | 50 | LiOH | 0% | B |
| 209 | 50 | LiOH | +10% | B |
| 209 | 25 | NH$_4$OH | 0% | T |
| 209 | 33 | NH$_4$OH | 0% | T |
| 209 | 50 | NH$_4$OH | 0% | T |
| 222 | 50 | KOH | 0% | B |
| 166 | 50 | KOH | 0% | B |
| 1561 | 50 | KOH | 0% | B |
| 1578X1 | 50 | KOH | 0% | B |
| 209 | 0 | KOH | 0% | B |
| 209 | 25 | KOH | 0% | B |
| 209 | 33 | KOH | 0% | B |
| 209 | 66 | KOH | 0% | B |
| 209 | 75 | KOH | 0% | T |
| 209 | 100 | none | — | T |

Elastomers used: 209=Butofan™ NS209 SBR

222=Butofan™ NS222 SBR

166=Butofan™ NS166 SBR

1561=Hycar™ 1561 nitrile rubber

1578X1=Hycar™ 1578 nitrile rubber

Basicity level: Expressed in terms of deviation from stoichiometric calculation

Removability: T=transferred to surface

B=remained bonded to tape backing

As can be seen from the above data, poly(α-olefin) PSAs remain bonded to tape backings when those backings are first primed with an above-described priming layer. Conversely, those tapes where NH$_4$OH was used to neutralize the rosin, those tapes where the primer included at least 75% elastomer, and one tape where the rosin was not fully neutralized exhibited transfer to the panel. The adhesives in the other samples remained bonded to the tape backing and did not transfer to the panel.

Various modifications and alterations that do not depart from the scope and spirit of this invention will become apparent to those skilled in the art. This invention is not to be unduly limited to the illustrative embodiments set forth herein.

I claim:

1. A pressure sensitive adhesive tape construction comprising:
   (a) a substrate;
   (b) on at least one surface of said substrate, a primer comprising the metal salt of a rosin acid; and
   (c) coated on said primer, a layer of poly(α-olefin) pressure sensitive adhesive; wherein said poly(α-olefin) pressure sensitive adhesive does not transfer to a surface after being adhered thereto, exposed to 177° C. for 30 minutes, and removed immediately thereafter.

2. The tape construction of claim 1 wherein said substrate is an elastomer-saturated paper.

3. The tape construction of claim 2 wherein said elastomer is a styrene-butadiene rubber.

4. The tape construction of claim 3 wherein said primer further comprises a styrene-butadiene rubber.

5. The tape construction of claim 2 wherein said elastomer is an acrylate polymer.

6. The tape construction of claim 5 wherein said primer further comprises an acrylate polymer.

7. The tape construction of claim 1 wherein said poly(α-olefin) pressure sensitive adhesive is crosslinked.

8. The tape construction of claim 1 wherein said rosin is at least partially hydrogenated.

9. The tape construction of claim 8 wherein said substrate is an elastomer-saturated paper.

10. The tape construction of claim 9 wherein said elastomer is a styrene-butadiene rubber.

11. The tape construction of claim 10 wherein said primer further comprises a styrene-butadiene rubber.

12. The tape construction of claim 9 wherein said elastomer is an acrylate polymer.

13. The tape construction of claim 12 wherein said primer further comprises an acrylate polymer.

14. The tape construction of claim 8 wherein said poly(α-olefin) pressure sensitive adhesive is crosslinked.

15. A composite construction comprising a metallic surface with the tape construction of claim 1 adhered thereto.

16. The composite construction of claim 15 wherein said metallic surface is steel or aluminum.

17. The composite construction of claim 15 wherein said metallic surface is a part of an automobile or aircraft.

18. A composite construction comprising a metallic surface with the tape construction of claim 8 adhered thereto.

19. The composite construction of claim 18 wherein said metallic surface is steel or aluminum.

20. The composite construction of claim 18 wherein said metallic surface is a part of an automobile or aircraft.

21. The tape construction of claim 1 wherein said primer further comprises an elastomer.

22. The tape construction of claim 21 wherein said salt of a rosin acid comprises at least about 25 weight percent of said primer and said elastomer comprises no more than about 75 weight percent of said primer.

23. The tape construction of claim 22 wherein said elastomer and said salt of a rosin acid both comprise about 50 weight percent of said primer.

24. A pressure sensitive adhesive tape construction comprising:
   (a) a paper backing saturated with styrene-butadiene rubber;
   (b) on a surface of said backing, a primer layer comprising an alkali metal salt of a hydrogenated rosin and styrene-butadiene rubber; and
   (c) coated on said primer, a layer of a poly(α-olefin) pressure sensitive adhesive; wherein said poly(α-olefin) pressure sensitive adhesive does not transfer to a surface after being adhered thereto, exposed to 177° C. for 30 minutes, and removed immediately thereafter.

25. The tape construction of claim 24 wherein said styrene-butadiene rubber and said alkali metal salt of a hydrogenated rosin both comprise about 50 weight percent of said primer layer.

26. The pressure sensitive adhesive tape construction of claim 1 wherein the surface is a stainless steel surface.

27. The pressure sensitive adhesive tape construction of claim 24 wherein the surface is a stainless steel surface.

28. A pressure sensitive adhesive tape construction comprising:
(a) a substrate;
(b) on at least one surface of said substrate, a primer comprising greater than 25 wt-% of the metal salt of a rosin acid; and
(c) coated on said primer, a layer of poly($\alpha$-olefin) pressure sensitive adhesive.

29. A pressure sensitive adhesive tape construction comprising:
(a) a paper backing saturated with styrene-butadiene rubber;
(b) on a surface of said backing, a primer layer comprising greater than 25 wt-% of an alkali metal salt of a hydrogenated rosin and styrene-butadiene rubber; and
(c) coated on said primer, a layer of a poly($\alpha$-olefin) pressure sensitive adhesive.

* * * * *